United States Patent
White et al.

(10) Patent No.: US 6,289,636 B1
(45) Date of Patent: *Sep. 18, 2001

(54) EASY PARKING METER POST REPLACEMENT WITHOUT EXCAVATING THE STREET OR SIDEWALK

(75) Inventors: Kenneth R. White, Russellville; Seth Ward, II, Little Rock, both of AR (US)

(73) Assignee: POM Incorporated, Russellville, AR (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/393,038

(22) Filed: Sep. 9, 1999

Related U.S. Application Data

(60) Provisional application No. 60/136,896, filed on Jun. 1, 1999.

(51) Int. Cl.$^7$ .................................................. E04H 12/08
(52) U.S. Cl. .................................. 52/40; 52/38; 52/514; 52/726.4; 52/736.1; 248/544; 248/548; 248/909; 403/279; 403/374.4
(58) Field of Search ...................... 52/38, 726.3, 726.4, 52/736.1, 736.3, 514, 40; 403/297, 374.3, 374.4; 248/544, 548, 909

(56) References Cited

U.S. PATENT DOCUMENTS

| | | | |
|---|---|---|---|
| 1,869,780 | * 8/1932 | Rosener | 285/148 |
| 2,077,769 | * 4/1937 | Postlewaite | 285/148 |
| 2,192,484 | * 3/1940 | Bryan | 403/297 |
| 3,193,059 | * 7/1965 | Wallerstein | 248/548 |
| 4,283,157 | * 8/1981 | Kowalski | 403/297 |
| 4,798,273 | * 1/1989 | Ward, II | 194/350 |
| 5,219,449 | * 6/1993 | Hoshino | 403/297 |
| 5,642,957 | * 7/1997 | Lange | 403/297 |
| 5,893,675 | * 4/1999 | Lange | 403/297 |
| 6,098,361 | * 8/2000 | Roten et al. | 52/298 |

* cited by examiner

Primary Examiner—Yvonne M. Horton
(74) Attorney, Agent, or Firm—Groover & Associates; Robert Groover; Betty Formby

(57) ABSTRACT

Replacement of a damaged post for a parking meter can be accomplished by cutting the post off near the ground and affixing a replacement post to the stub of the original post with a retaining device which grips the two portions of the post from inside the post. The retaining device is only reachable through the post when the meter head is removed, thus preserving the integrity of the post from vandals.

12 Claims, 5 Drawing Sheets

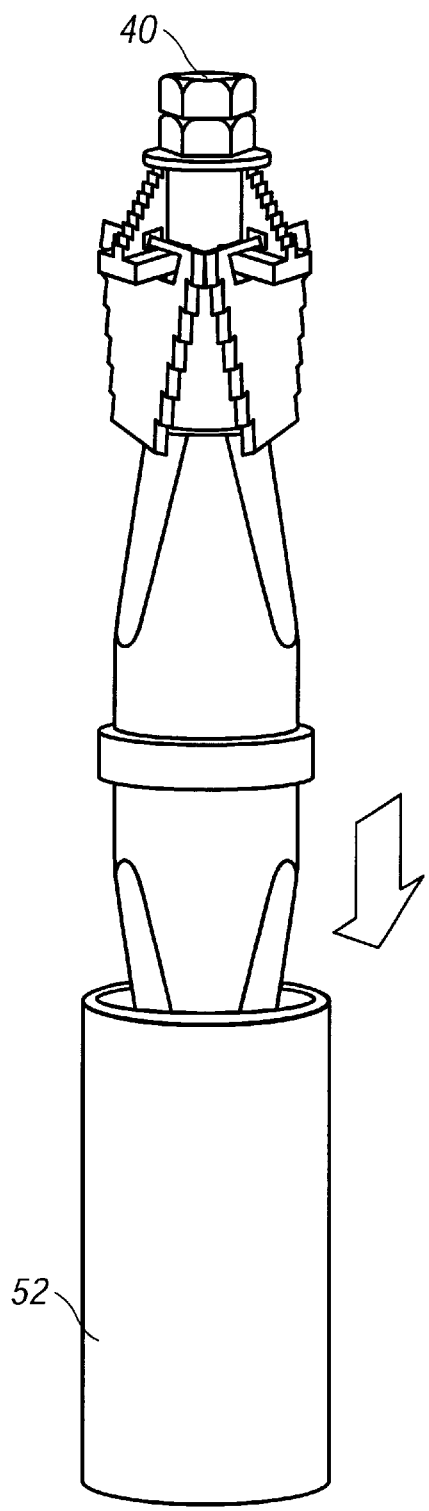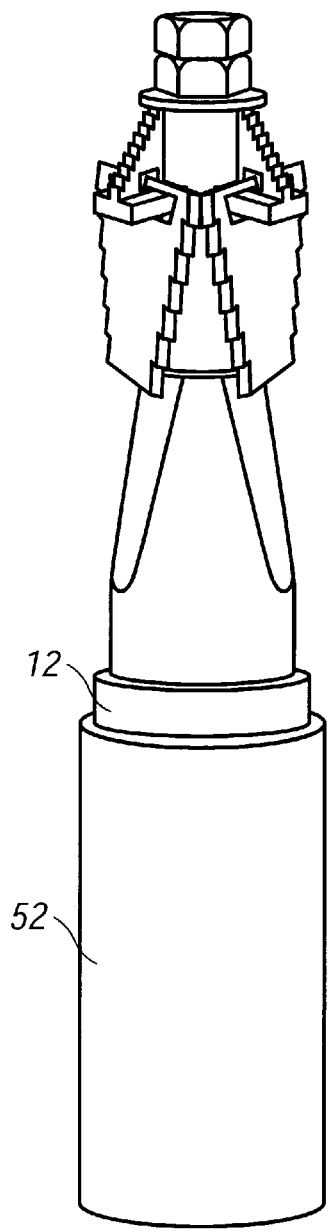
FIG. 1A  FIG. 1B

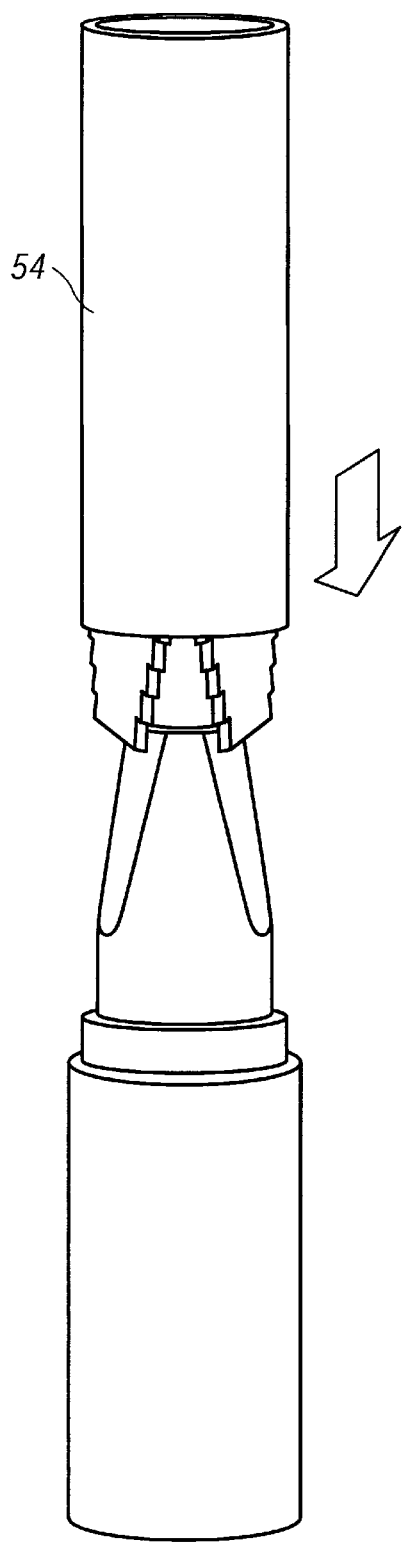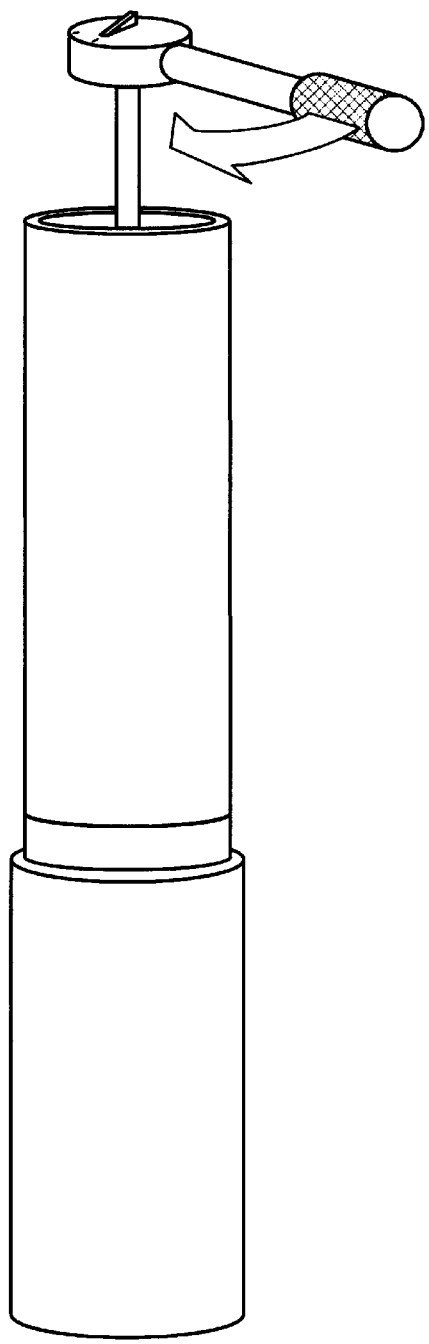
*FIG. 1C*          *FIG. 1D*

EASY PARKING METER POST REPLACEMENT WITHOUT EXCAVATING THE STREET OR SIDEWALK

CROSS-REFERENCE TO RELATED APPLICATION

This application claims priority from provisional 60/136,896, filed Jun. 1, 1999.

BACKGROUND AND SUMMARY OF THE INVENTION

The present invention relates to the support posts used for parking meters and other devices where it is desirable to couple ease of replacement with security against vandals.

Background: Parking Meter Supports

A basic challenge with parking meters is that they are necessarily located in very exposed locations, where they may be damaged by vandalism, theft, and impacts from automobile bumpers. A secure physical connection to the ground is therefore necessary. However, it can also become necessary to remove the post for replacement (e.g., after it is struck by a car).

Seen in FIG. 8 is a typical electronic parking meter. Meter head 42 contains a display window 41 for communication to the user, a slot 43 for the receipt of coins or tokens and optionally another slot 44 for the use of electronic cards for payment of fees. Immediately below the meter head 42 is a vault 48 within which collected payments are stored. This vault has an access door 47, which is secured by a lock 49. The meter head and vault are mounted on a post 52, which is generally hollow, round, and made of galvanized steel or other heavy duty metal.

Vandalism is generally aimed at theft of the coins collected in a meter, so a great deal of engineering goes into the design of the meter head and vault to make access to the stored money as difficult as possible. Additionally, the connection of the meter head and vault to the post, as well as the connection of the post to the ground, must be very secure; the latter of these concerns will be discussed.

Because of these security needs, most parking meter posts are permanently affixed to the ground, e.g., by a concrete base 57. Removal of such a post requires considerable labor to break down the concrete base and remove the post. To replace the post, the hole must then be cleared and refilled with concrete, and a new post set and leveled.

Co-pending application Ser. No. 09/038,218, filed Mar. 11, 1998, now U.S. Pat. No. 6,098,361, which is commonly owned by the assignee of this application and which is hereby incorporated by reference, discloses a method of mounting a parking meter post in a manner which both provides a secure, vandal-resistant mount, yet is easy for an authorized person to remove or replace if necessary. However, this method requires that a special base and slotted post be used, and cannot be used on existing posts which have already been cemented into the ground.

U.S. Pat. No. 4,798,273 to Seth Ward, which is commonly owned by the assignee of this application and which is hereby incorporated by reference, discloses one method of attaching a parking meter and vault to a post. This patent describes a joining assembly which is fastened to the vault by a bolt accessible only from the interior of the vault. The joining assembly is then inserted into a mounted post, where tightening the bolt causes toothed expansion wedges to be forced against the inside of the post by a tapering base. These toothed expansion wedges provide resistance to anyone who attempts to remove the meter and vault from the post, yet an authorized person can open the vault door and access the bolt to remove the meter and vault from the post.

Easy Parking Meter Post Replacement Without Excavation

The present application discloses a device and method of replacing an existing post by cutting off the defective post, preferably near the ground, then attaching a replacement post by means of a joining device which fits inside both the replacement post and the remaining portion of the old post. The joining device is formed of two sets of back-to-back toothed expansion wedges which are forced against the insides of the two separate sections of post to hold them together. The movement of the expansion wedges against the insides of the two posts is controlled by tightening a bolt which is reachable only by going through the upper portion of the post itself. After installing the new section of post, the meter head is installed and the joining device is only accessible by someone who has access to the vault of the meter and can therefore remove the meter head.

The disclosed innovations, in various embodiments, provide one or more of at least the following advantages:

- replacement of a post does not require excavation of the concrete which holds the post in the ground;
- the new post is securely held in place by a mechanism which is not accessible to vandals.

BRIEF DESCRIPTION OF THE DRAWING

The disclosed inventions will be described with reference to the accompanying drawings, which show important sample embodiments of the invention and which are incorporated in the specification hereof by reference, wherein:

FIGS. 1A–D shows the disclosed joining device as it is being installed between a stationary post which is cemented into the ground and a replacement piece of post to which it is to be affixed.

DETAILED DESCRIPTION OF THE PREFEERED EMBODMENTS

The numerous innovative teachings of the present application will be described with particular reference to the presently preferred embodiment (by way of example, and not of limitation).

Figure 7A:
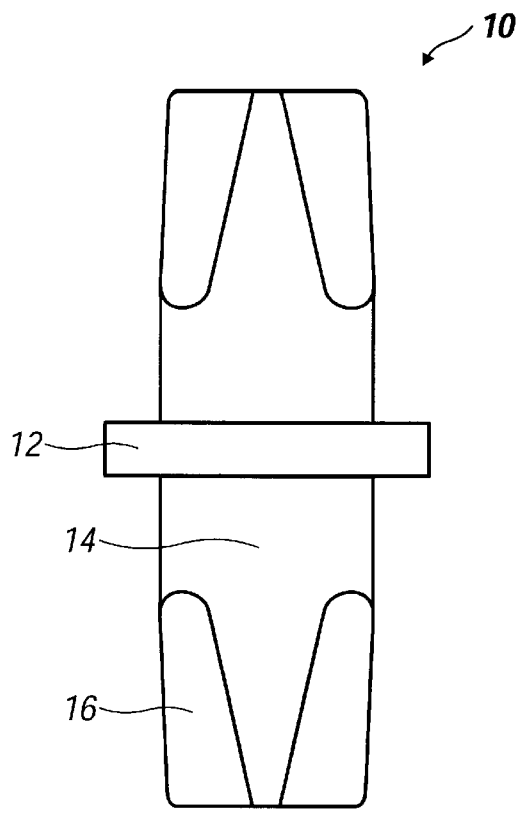
FIGS. 7A–C show side and end views of the base piece of the joining device prior to assembly.
Figure 7B:
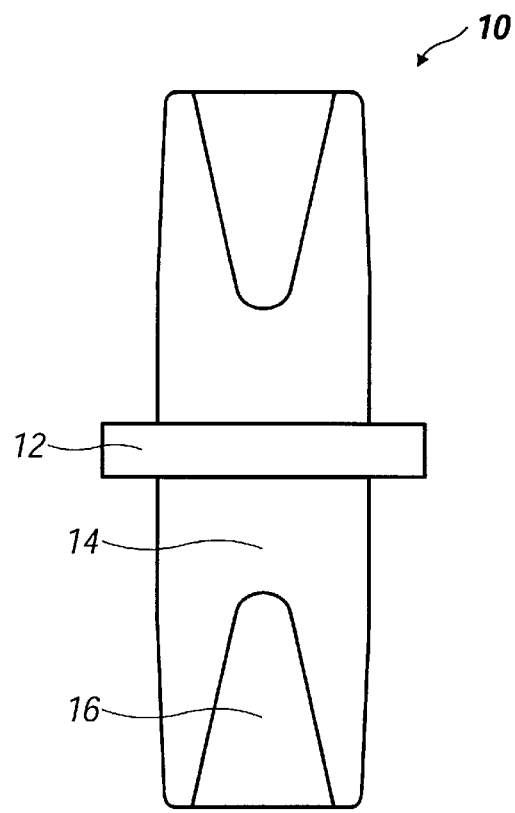
Figure 7C:
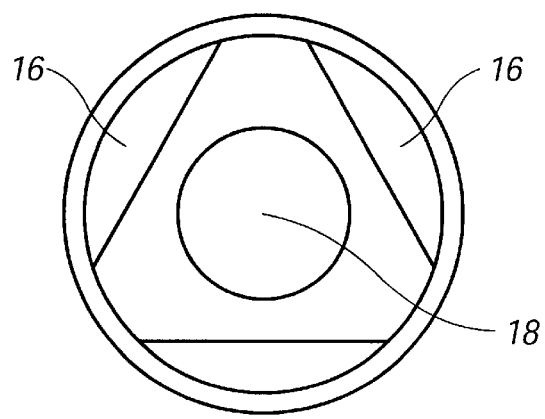

Seen in FIGS. 7a and 7b are side views of base 10 of the device, which is machined from a piece of hardened steel. At the midpoint of the base 10 is a ring portion 12 circumscribing the base 10. This ring is slightly larger than the inside diameter of the posts into which the device will be inserted. This facilitates holding the joining device at the correct location in the stationary portion of the post while the replacement portion of the post is installed. Moving outward from the ring 12, each end of the base has a cylindrical portion 14, which is smaller than the inside diameter of the posts being joined, followed by a portion in which are a number of flat, sloping sections 16. In the presently preferred embodiment, there are three of these flat sloping sections equally spaced around the circumference at each end of the base. These can be seen in FIG. 7C, which is an end-on view of the base. Also seen in this figure is a hole 18 which runs the length of the base 10, through its longitudinal axis. After assembly, this hole 18 accommodates a bolt which runs through the center of the base.

Figure 5:
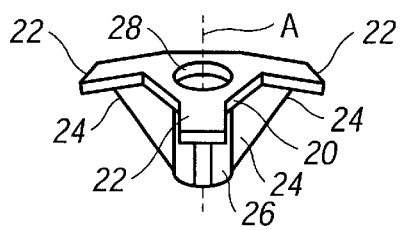
FIG. 5 shows an expansion nut.
Figure 8:
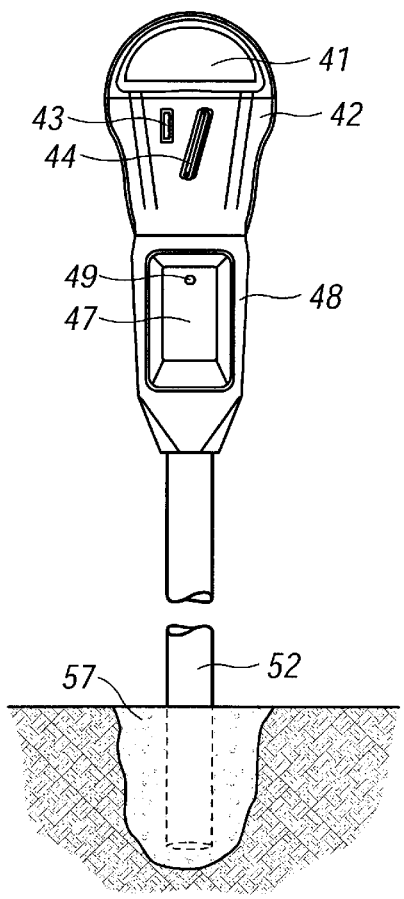
FIG. 8 shows a conventional electronic parking meter mounted to a post.

Seen in FIG. 5 is an anchor nut 20 which will form part of the joining device. The anchor nut has three equally spaced tongues 22 extending from a central cylinder, or body 26 through which a threaded bore 28 extends. Each of the tongues 22 includes a support flange 24 extending between a lower side of the tongue 22 and the cylindrical body 26 for added strength. Each of the tongues is sloped downwardly somewhat with respect to a plane perpendicular to an axis A that extends through the bore in the anchor nut and along the bolt when the nut is on the bolt.

Figure 4:
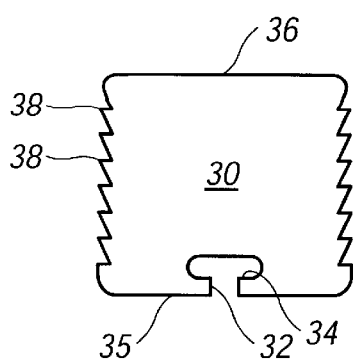
FIG. 4 shows one of the gripper pieces.

FIG. 4 shows a gripper wedge 30 which is formed from flat sheet metal which has been hardened, e.g. by heat treatment. Each gripper wedge has teeth 38 on two opposing sides, a flat top edge 36, and a bottom edge 35 having a slot 34, which has a channel 32 which extends from the slot 34 to the edge 35 of the gripper wedge.

When the joining device is assembled (see FIG. 2), a bolt 40 is inserted through the hole 18 in the base piece 10, with an anchor nut 20 threaded on each end of the bolt. The bolt is threaded so that turning the bolt in a clockwise direction will cause both anchor nuts to move closer together along the length of the bolt. Three gripper wedges 30 are attached to each expansion nut by sliding the slot 34 on the gripper wedge over the tongue 22 the expansion nut 20, with clearance for the support flange 24 being provided by the channel 32. In this position, the top edge 36 of the gripper wedge 30 can ride against a flat, sloping portion 16 of the base 10. The gripper wedges 30 are not tightly fastened to the anchor nuts 20, and need to be held in place prior to insertion into a post. This is typically done with a heavy rubber band or the like, which can be removed at installation.

From the above description, it will be clear that turning the bolt 40 in a clockwise direction, in addition to pulling the expansion nuts 20 inward, causes the top edge 36 of the gripper wedges to ride further up the flat, sloping portions 16 of the base. As this happens, the gripper wedges 30 are forced outward from the longitudinal axis of the base. At the same time, the loose attachment of these pieces to the expansion nut and the slight slope of the tongues 22 of the expansion nut, allows the bottom edge 35 of the gripper wedges to also move outwardly from the longitudinal axis.

FIG. 1A shows the innovative joining device being inserted into a stationary section of post 52 which is mounted in concrete. When this is done, the bolt 40 is loose enough to allow the ends of the device to slip into the post without undue binding. For ease of handling, the rubber bands holding the gripper wedges have been left in place, as they will not interfere with the action of these parts. FIG. 1B shows the joining device fully inserted into stationary post 52, where it is held in position by the circumferential ring 12. FIG. 1C shows the replacement post 54 being inserted over the remaining end of the joining device. Once the two ends of the posts are positioned correctly, the bolt is then tightened. FIG. 1D shows an installer tightening the bolt, using a socket wrench with an extension arm which reaches down through the post. This moves the expansion nuts toward the ring on the base and forces the upper edge of the gripper wedges to ride upward and outward along the sloping portion of the base. The outward movement of the gripper wedges will jam them into the inner surface of the post, providing a great deal of resistance to the removal of the joining device from the post.

Once the two post pieces are joined together, the meter head is attached to the post, preferably with the mechanism described by U.S. Pat. No. 4,798,273.

Figure 2:
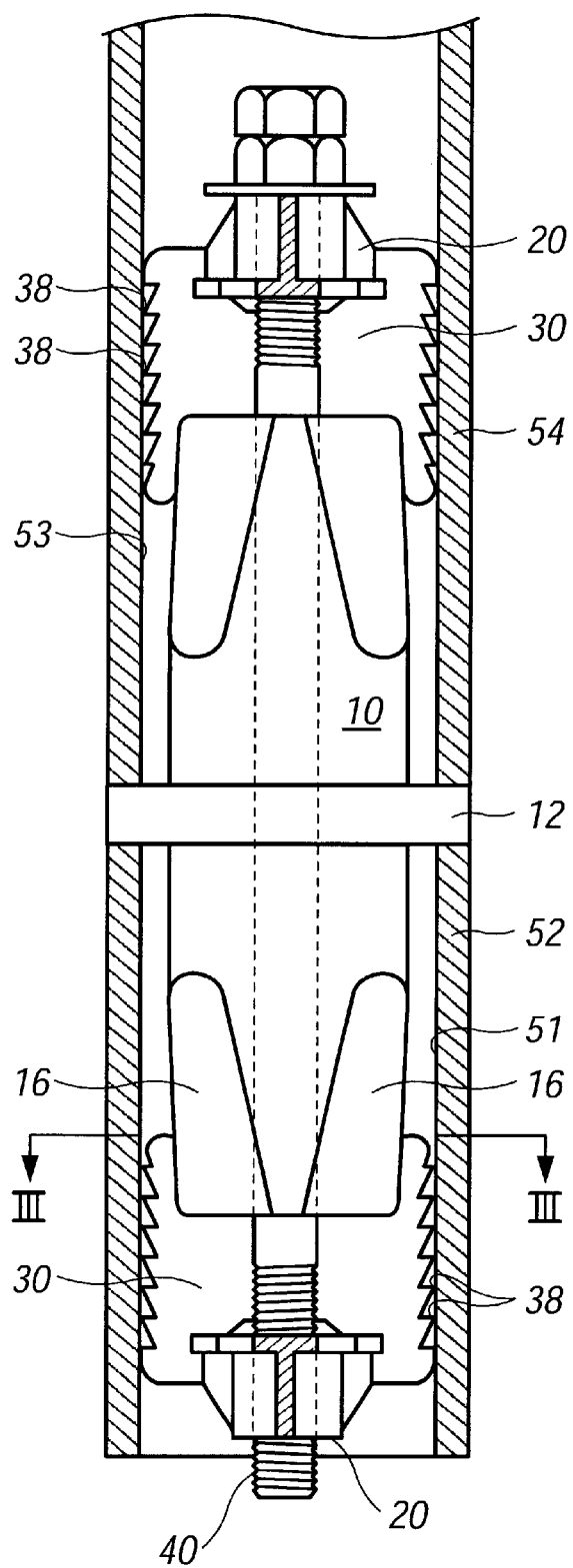
FIG. 2 shows a cut-out of a post within which is installed the disclosed joining device.

FIG. 2 shows a cut-away of the post with the installed joining device. Ring 12 is seen between sections of posts 52 and 54, holding base 10 in the proper position. Bolt 40 runs through base 10, with expansion nuts 20 attached by threaded connections. The two closer gripper wedges are not shown in this drawing, but the sloping portions 16 of the base 10 on which they would ride are seen. The two visible gripper wedges 30 are seen behind the base 10, where their teeth 38 are seen digging into the inner surfaces 51 and 53 of posts 52 and 54.

Figure 3:
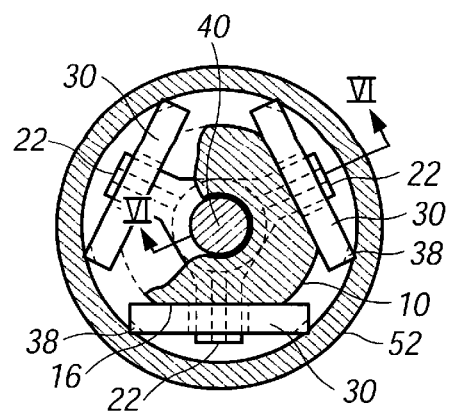
FIG. 3 shows a view of the installed gripper device, seen from a point above the installed device.

A cross section of the installed joining device (with all three gripper wedges) taken at plane III—III of FIG. 2 is seen in FIG. 3. Base 10 is seen centered within pipe 52, with bolt 40 running through its main axis. Flanges 22 of wing nut 20 extend outwardly from the bolt and support the three gripper wedges 30, whose teeth 38 are jammed into the inside of pipe 52. The top edge 36 of each gripper wedge is riding against sloping sections 16 of base 10.

Figure 6:
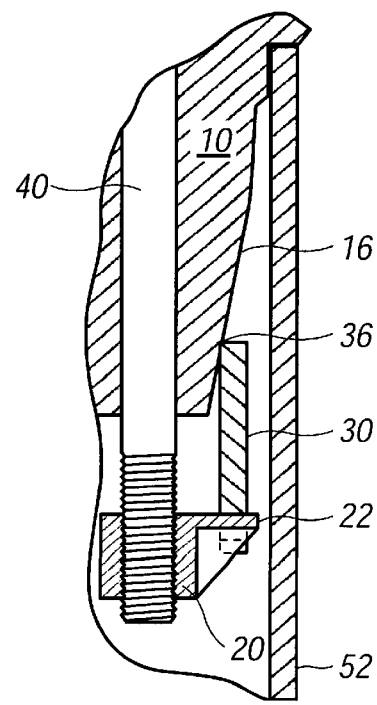
FIG. 6 shows a cross-sectional view of the installed joining device, taken at line VI—VI of FIG. 3.

FIG. 6 is a cross-section of the device, taken at plane VI—VI of FIG. 3. In this drawing, bolt 40 runs through base 10 into expansion nut 20. A cross-section of a gripper wedge 30 is seen, with one surface of the slot 34 riding along the tongue 22 of the expansion wedge and the upper edge 36 of the gripper wedge riding against the sloping portion 16 of the base 10. Because the cross-section of the gripper wedge is taken near its center point, the wedge does not appear to be engaging the post 52, even though the teeth of the gripper wedge are jammed into the post sections. Each gripper wedge preferably has contact with the inside of the post along the length of the two toothed edges, and will have sufficient force applied that the teeth actually bite into the post.

If an attempt is made to remove the upper post from the lower post, the teeth 38 will be driven further into the post, so that removal is very difficult. However, if an authorized person needs to remove the upper portion of the post, e.g. if this post is in turn damaged, all that is necessary is access to the inside of the post, which can be gained by an authorized person unlocking the vault and removing the meter head. The bolt is loosened, again with an extension device, until the movement of the expansion nuts away from each other causes the teeth to disengage from the inside of the post. This may necessitate loosening until one of the expansion nuts falls off the bolt and allows the pieces of the joining device to be separated.

Test Results

A prototype of the disclosed joining device was installed at a test location and underwent destructive testing,. A length of chain was attached near the upper end of the replacement post section and attached to the frame of a pick-up truck, approximating an attempt by a vandal to pull off the upper portion of the post, with meter attached, for later opening of the vault. In the testing, the post was bent, but the innovative joining device held the two sections of post together.

Alternate Embodiments

In an alternate embodiment, the elements which bind against the inside of the posts are not toothed, but comprise a smooth or roughened surface which will bind against the inner wall of the posts.

In a further alternate embodiment, rather than a flat gripper piece riding up a sloping section of the base, both the base and gripper piece are wedges, with mated sloping surfaces of the wedges causing an outer surface of each to bind against the inner wall of the post.

Many other variations in the shape of various parts is possible to allow a device which is inserted inside the post ends to be tightened to bind against the inside surface of the posts.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, while the disclosed embodiment contemplates that the stationary portion of the post and the replacement portion of the post have identical internal diameters, this is not necessary to the practice of the invention. By altering the dimensions of each end of the joining device, this device can be used to join pipes of unequal diameters.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A device for permanently joining first and second different hollow post sections, said device comprising:
    an elongated unitary body of a hard material, a first end of said body fitting adopted to fit into the interior of said first section of post, a second end of said body fitting adopted to fit into the interior of said second section of post, said body having a positioning portion which aids in properly positioning said body in relationship to said first and second sections of hollow post;
    first and second pluralities of gripping pieces, first ends of said first and second pluralities of gripping pieces respectively riding against an outer diameter of said first and second ends of said body, and second ends of said first and second pluralities of gripping pieces extending outwardly from said body;
    a tightening mechanism running through said unitary body and connected to said pluralities of gripping pieces in a manner that allows said first and said second pluralities of gripping pieces adapted to be tightened against the inside of the first and second post sections at the same time, said tightening mechanism being activated at one end of said body
    whereby said two sections of hollow post are not capable of separation without access to the interior of one of said two sections of hollow post.

2. The device of claim 1, wherein said tightening mechanism comprises a screw thread which is adopted to be turned.

3. The device of claim 1 wherein said gripping pieces comprise flat, toothed pieces of metal.

4. The device of claim 1, wherein said body comprises a plurality of sloped surfaces against which said gripping pieces ride.

5. A device for permanently joining two different sections of a hollow post, comprising:
    an elongated unitary body having a plurality of sloping surfaces at a first end and at a second end of said body;
    a single bolt extending through said body along its longitudinal axis, said bolt having first and second nuts threadably attached thereto at first and second ends respectively of said body;
    a plurality of toothed pieces which are connected to said first and second nuts such that a first surface of ones of said toothed pieces rides against respective ones of said plurality of sloping surfaces;
    wherein turning said bolt forces said plurality of toothed pieces at both ends of said body to move both in a direction which is radial to said longitudinal axis of said body and in a direction which is parallel to said longitudinal axis of said body;
    wherein said first and second hollow sections of pipe are not capable of separation without access to the interior of said second hollow section of pipe.

6. The device of claim 5, wherein said body further comprises a circumferential portion which has a diameter adopted to be greater than the inside diameter of said two sections of hollow post.

7. A permanent post for a parking meter, comprising:
    a first hollow section of pipe, having a first end which is physically attached to the ground in a permanent manner, and a second end, opposite said first end;
    a second hollow section of pipe, having a first end to which is mounted a parking meter and having a second end opposite said first end, wherein said first and said second hollow sections of pipe are different sections of pipe;
    a joining device which has a first end attached to the inside of said second end of said first hollow section of pipe and a second end attached to the inside of said second end of said second hollow section of pipe, said joining device comprising:

an elongated unitary body having a plurality of sloping surfaces at a first end and at a second end of said body, a bolt extending through said body along its longitudinal axis, said bolt having first and second nuts threadably attached thereto, a first plurality of gripping pieces which ride against an outer diameter of said body and which tightly engage the inside surface of said first hollow section of pipe, a second plurality of gripping pieces which ride against said body and which tightly engage the inside surface of said second hollow section of pipe;

wherein said first and second hollow sections of pipe cannot be separated without access to the interior of said second hollow section of pipe.

8. The post of claim 7, wherein said gripping pieces comprise toothed elements.

9. The post of claim 7, wherein said first and second sections of pipe have essentially the same internal diameter.

10. The post of claim 7, wherein said body further comprises a circumferential portion which has a diameter greater than the internal diameter of said first and said second hollow sections of pipe.

11. A method of replacing a post for a parking meter, comprising the steps of:

(a.) cutting off a damaged portion of a hollow post for a parking meter to leave a stub of post still attached to the ground in a permanent manner;

(b.) inserting a first end of a joining device into said stub of post and a second end of said joining device into a new section of hollow post;

(c.) tightening said joining device through access to the interior of said new section of hollow post to cause said joining device to grip the inside of said stub of post and said new section of hollow post;

(d.) installing a device on said new section of hollow post; whereby said stub of post and said new section of hollow post are resistant to external efforts to separate them.

12. The method of claim 11, wherein said device is a parking meter.

* * * * *